United States Patent
Huang

(10) Patent No.: US 9,604,566 B1
(45) Date of Patent: Mar. 28, 2017

(54) LAMP STRUCTURE

(71) Applicant: BIG TIME AUTO PARTS MFG. CO., LTD., Tainan (TW)

(72) Inventor: Yao-Hung Huang, Tainan (TW)

(73) Assignee: Big Time Auto Parts Mfg. Co., Ltd., Tainan (TW)

( * ) Notice: Subject to any disclaimer, the term of this patent is extended or adjusted under 35 U.S.C. 154(b) by 0 days.

(21) Appl. No.: 14/980,423

(22) Filed: Dec. 28, 2015

(51) Int. Cl.
*B60R 9/048* (2006.01)
*B60Q 1/26* (2006.01)

(52) U.S. Cl.
CPC .................. *B60Q 1/2611* (2013.01)

(58) Field of Classification Search
CPC .. B60D 2001/003; B60Q 1/26; B60Q 1/2611; B60R 9/10; B60R 9/052; F21S 48/1118; F21S 48/20
USPC .......... 362/549, 493; 296/141, 187; 224/324
See application file for complete search history.

(56) References Cited

U.S. PATENT DOCUMENTS

| 8,985,414 B2 * | 3/2015 | Aftanas ............... B60Q 1/2611 224/309 |
| 2007/0217212 A1 * | 9/2007 | Klinkman ............... B60Q 1/24 362/493 |
| 2014/0124551 A1 * | 5/2014 | Condon .................. B60R 9/048 224/324 |

FOREIGN PATENT DOCUMENTS

TW            M492268 U        12/2014

* cited by examiner

*Primary Examiner* — Andrew Coughlin
*Assistant Examiner* — Keith Delahoussaye
(74) *Attorney, Agent, or Firm* — Rosenberg, Klein & Lee

(57) ABSTRACT

A lamp structure is provided in which a roof rack fixed on top of a car has an engaging slot for locking with a detent portion formed on the bottom of a positioning unit. A connecting portion extending on the detent portion has a fitting indentation with a positioning member penetrating therethrough, one end of the positioning member having a snap-fit portion provided on one end and a positioning pulling lever pivotally provided on the other end. A warning lamp having a snap-fit groove for engaging with the snap-fit portion is combined with the connecting portion. Therefore, the warning lamp has higher assembly position so that light emitted from the warning light is clearly visible by rear drivers from a longer distance and hence has better eye-catching and warning effect, and better driving safety can be achieved.

5 Claims, 6 Drawing Sheets

LAMP STRUCTURE

BACKGROUND OF INVENTION

Field of the Invention

The present invention relates to a lamp structure, more particularly to a lamp structure in which light emitted from the warning light is clearly visible by rear drivers from a longer distance and hence has better eye-catching and warning effect and hence better driving safety can be achieved.

Brief Description of Prior Art

It is often seen that many people carry bicycles in their traveling, and ride the bicycles for leisure activities during a stopover. For the people driving a car, if the bicycle has to be carried by the car to the destination, a bike carrier is needed to fix the bicycle on the roof top. Various bike carriers available on market can be divided into two groups: rear mounting bike carrier and roof mounting bike carrier. The roof mounting bike carrier has two fixed frames set on the front, rear parts of the roof and two fixed frames on the left, right parts of the roof, then the front, rear wheels of the bicycle are respectively locked on the fixed frames so that the bicycle can be combined integrally with the car and moved with the car to the destination.

In order that the bike carrier also has light emitting function for warning, the inventor of the present invention has proposed a "Bike carrier lamp unit" publicized in Taiwanese Patent Gazette No. M492268 U, in which fixed frames for locking bicycles on the roof of a car are formed with engaging slots on the outside portions, whereby warning lamps can be fixed.

Although the above "Bike carrier lamp unit" disposed on the fixed frame of car roof can reach predetermined effect of emitting light for warning, it has, however, following disadvantages found in practical implementation.
1. The structure enables the warning lamp to be received in the engaging slot of the fixed frame, but as the warning lamp is disposed on a lower set position vulnerable to be blocked by other external factors, and this might lead to deteriorated light-emitting and warning effect of the warning lamp.
2. The structure enables the warning lamp to be received in the engaging slot of the fixed frame, but the warning lamp can be assembled at fixed angle and position only, and this may also cause light emitted from the warning lamp to be blocked by other external factors and thus the light-emitting and warning effect of the warning lamp is deteriorated.

SUMMARY OF THE INVENTION

The main object of the present invention is to provide a lamp structure in which a warning lamp is integrally combined with a roof rack through a positioning unit, so the warning lamp may be disposed on a higher set position. In this way, the light emitted from the warning light is clearly visible by rear drivers from a longer distance and hence has better eye-catching and warning effect. Therefore, better driving safety can be achieved.

BRIEF DESCRIPTION OF ACCOMPANYING DRAWING

DETAILED DESCRIPTION OF PREFERRED EMBODIMENTS

The objects, the technical contents and the expected effect of the present invention will become more apparent from the detailed description of a preferred embodiment in conjunction with the accompanying drawings.

Figure 1:
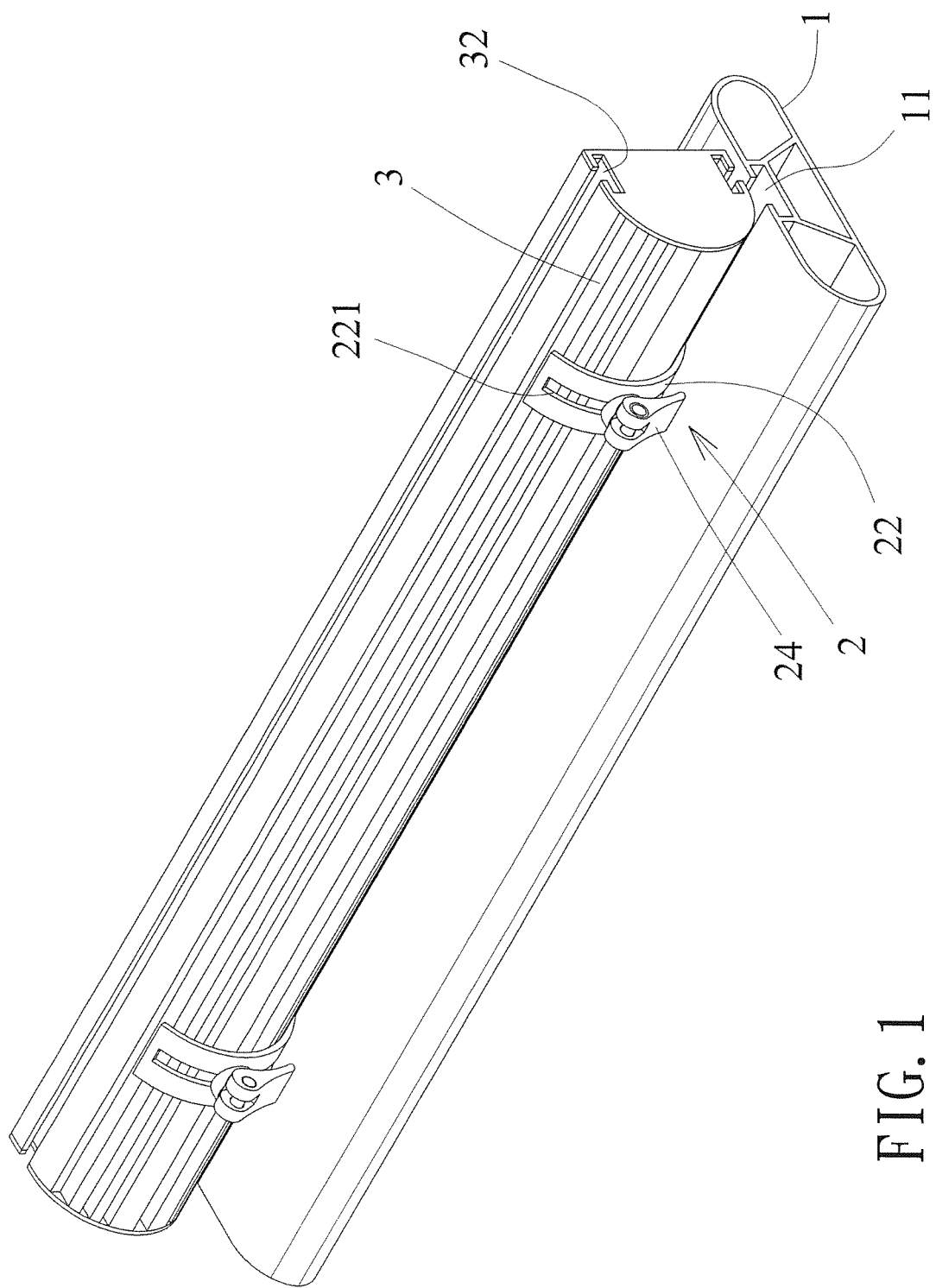
FIG. 1 is a perspective schematic view of the assembly structure of the present invention.
Figure 2:
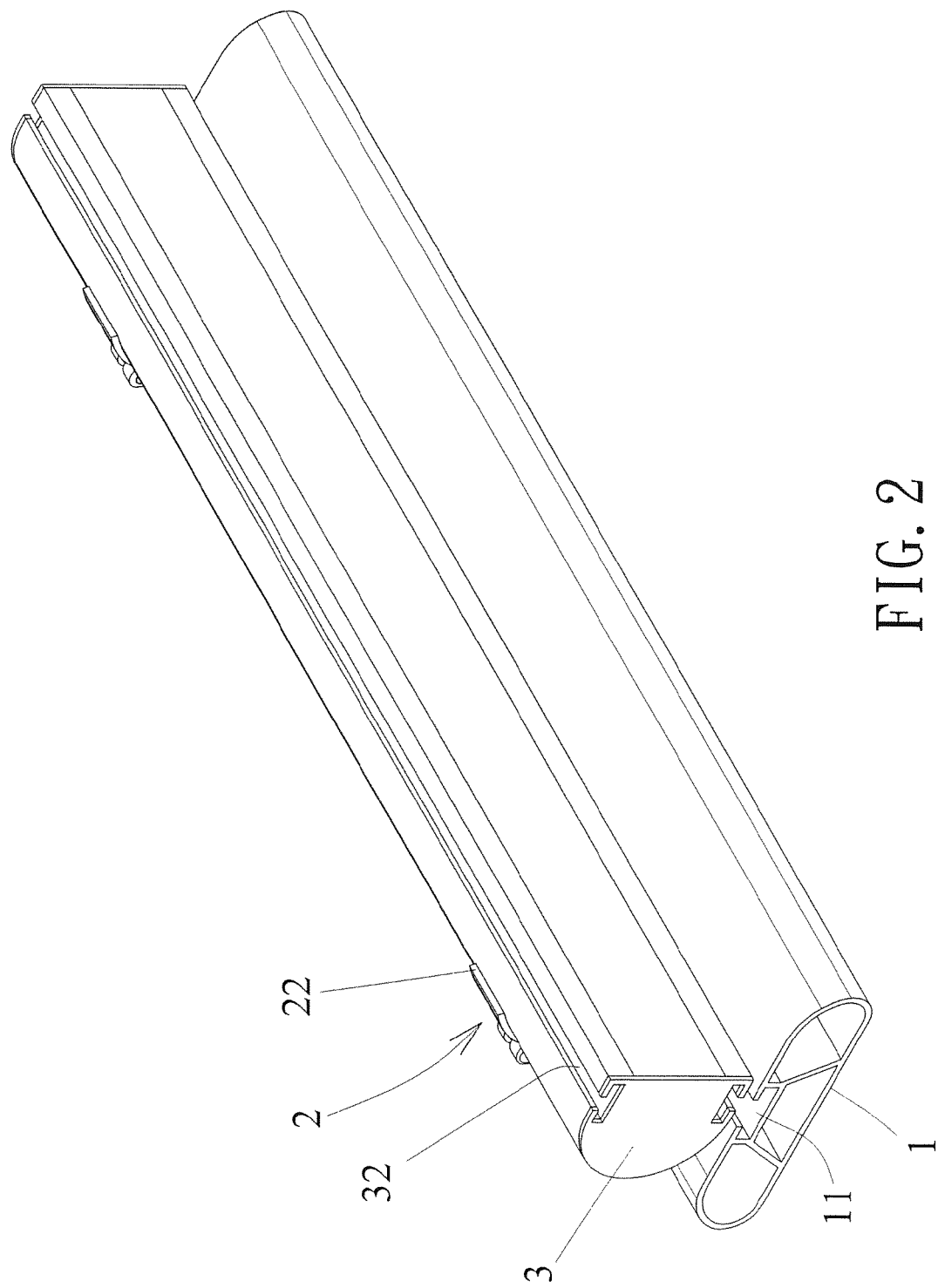
FIG. 2 is another perspective schematic view of the assembly structure of the present invention.
Figure 3:
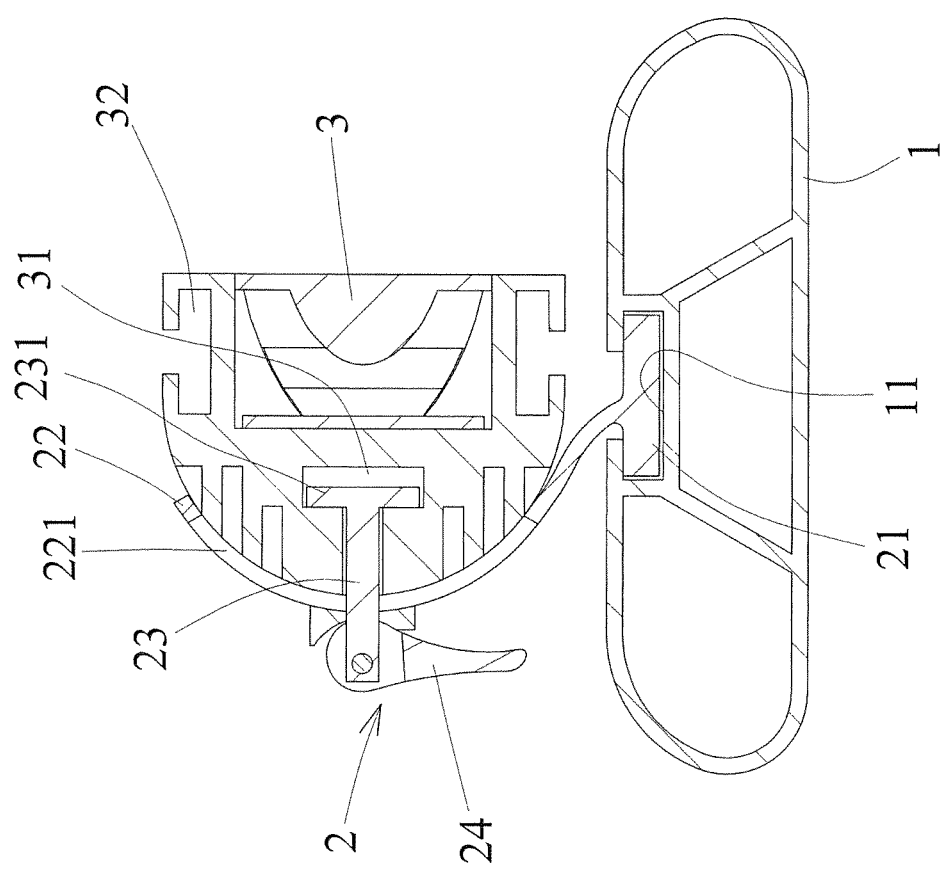
FIG. 3 is a sectional schematic view of the assembly structure of the present invention.

FIG. 1 is a perspective schematic view of the assembly structure of the present invention. FIG. 2 is another perspective schematic view of the assembly structure of the present invention. FIG. 3 is a sectional schematic view of the assembly structure of the present invention. As shown in these figures, the present invention mainly comprises a roof rack (1), a positioning unit (2) and a warning lamp (3).

The roof rack (1) has an engaging slot (11) provided on the top end thereof.

The positioning unit (2) has a detent portion (21), which corresponds to and can be engaged in the engaging slot (11) of the roof rack (1), formed on its bottom. A connecting portion (22) corresponding to the warning lamp (3) is formed to extend on the upper end of the detent portion (21). The connecting portion (22) has an elongate shape fitting indentation (221), and a positioning member (23) penetrates through the fitting indentation (221). The positioning member (23) has a snap-fit portion (231) formed on its one end and a positioning pulling lever (24) pivotally provided on the other end.

The warning lamp (3) is to be combined with the connecting portion (22) of the positioning unit (2). The warning lamp (3) has a snap-fit groove (31) formed to correspond to and to engage in the snap-fit portion (231) of the positioning member (23) of the positioning unit (2). Furthermore, a mounting slot (32) for mounting and locking of the bicycle is formed on the upper end of the warning lamp (3).

In the assembly of the present invention, firstly the detent portion (21) of the positioning unit (2) is engaged in the engaging slot (11) of the roof rack (1). Next, the warning lamp (3) is fitted with the connecting portion (22) of the positioning unit (2); after the snap-fit portion (231) of the positioning member (23) is engaged into the snap-fit groove (31), the positioning pulling lever (24) is turned so that the snap-fit portion (231) of the positioning member (23) is locked tightly within the snap-fit groove (31). In this manner, the warning light (3) can be integrally combined with the connecting portion (22) firmly.

Figure 4:
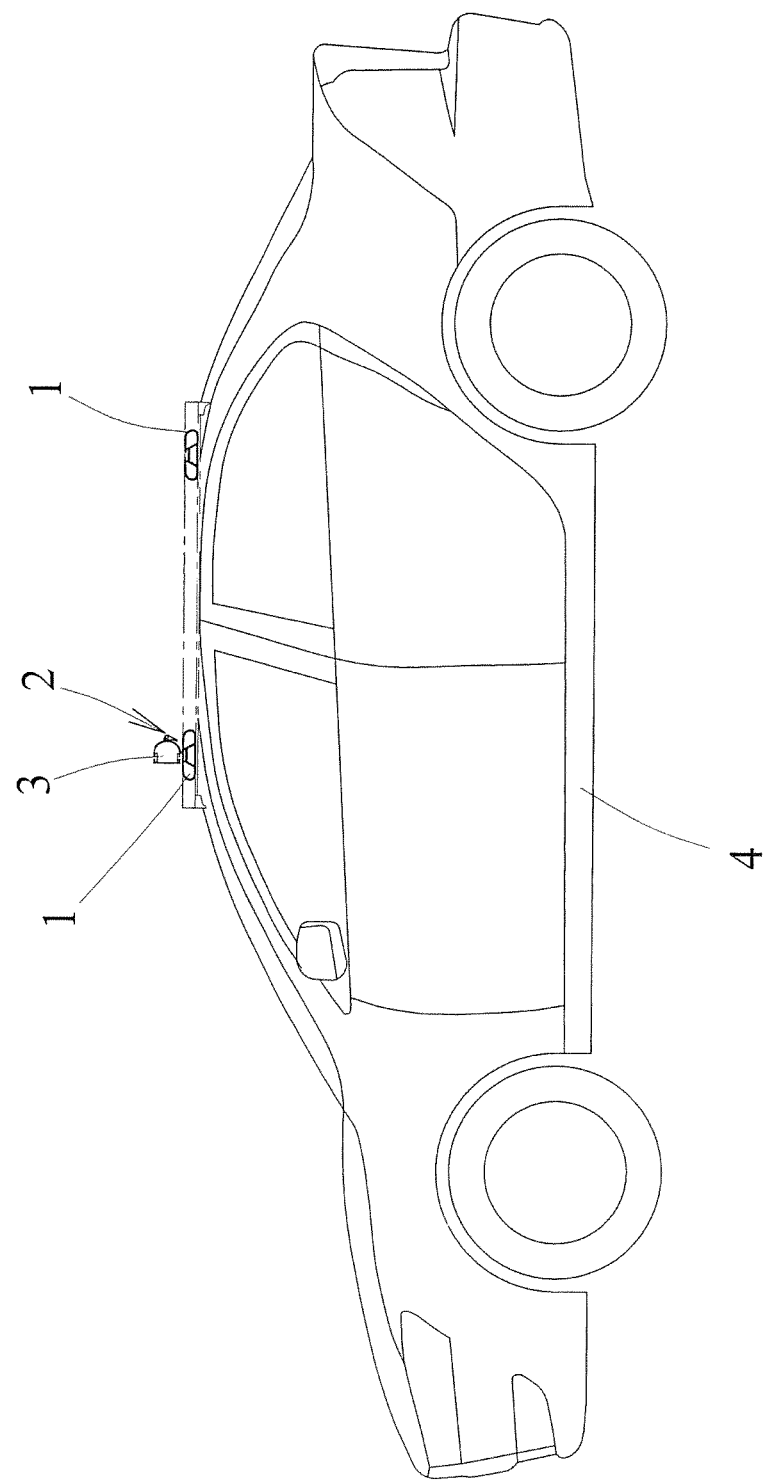
FIG. 4 is a schematic view of the present invention in use.
Figure 5:
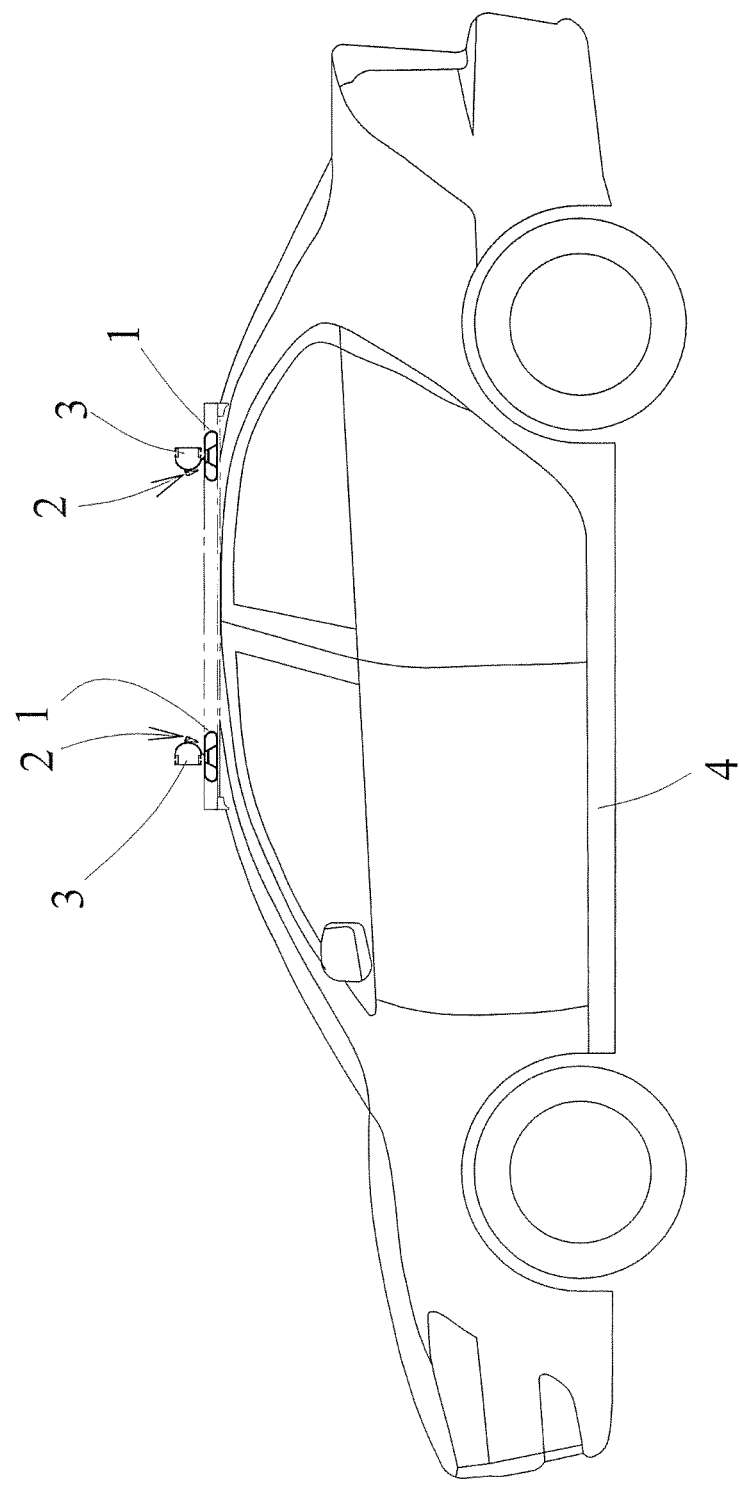
FIG. 5 is another schematic view of the present invention in use.

FIG. 4 is a schematic view of the present invention in use. The present invention configuring as above enables the roof rack (1) to be fixed on the roof of a car (4) and the warning lamp(s) (3) to be locked on one or two of the roof racks (1), as shown in FIG. 5, in such a manner that the warning lamp(s) (3) can be disposed at higher position through the positioning unit (2). Therefore, the light emitted from the warning lamp(s) (3) can be used as auxiliary warning light, or as auxiliary brake lamp or auxiliary direction lamp. As the roof rack (1) is set on the top of the car (4) at higher position, the light emitted from the warning lamp (3) is clearly visible by rear driver from a longer distance and hence has better eye-catching and warning effect. Therefore, better driving safety can be achieved.

Figure 6:
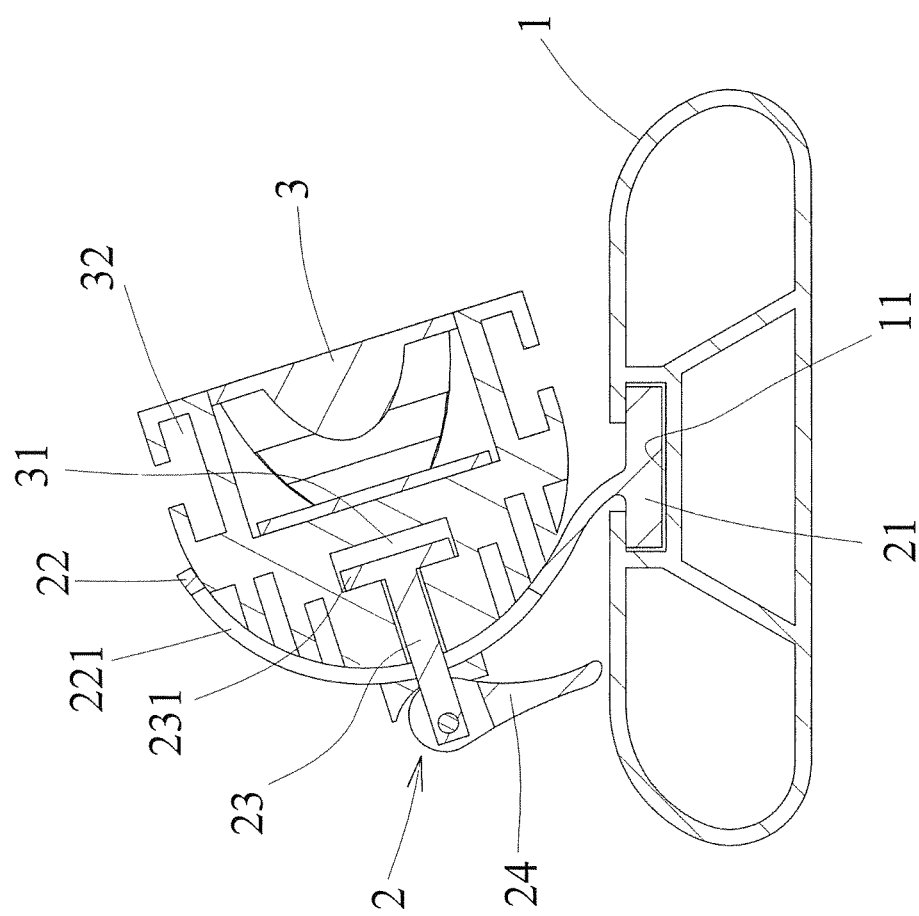
FIG. 6 is a schematic view of the present invention in angle adjustment state.

FIG. 6 is a schematic view of the present invention in angle adjustment state. Referring to this figure, the angle and the position of the warning lamp (3) can be adjusted by moving and adjusting the positioning member (23) in the elongate shape fitting indentation (221). Therefore, blocking of the light emitted from the warning lamp (3) can be avoided to happen.

It is apparent from the structure constitution and its implementation of the present invention that the present invention has the following advantages when comparing with prior art.

1. According to the present invention, the warning lamp is combined with the roof rack through the positioning unit, and the warning lamp can have higher assembly position so that the light emitted from the warning lamp can achieve better eye-catching and warning effect.

2. According to the present invention, the orientation angle of the warning lamp can be adjusted within the moving range along the elongate shape fitting indentation provided on the connecting portion of the positioning unit. Therefore, blocking of the light emitted from the warning lamp can be avoided to happen.

What is claimed is:

1. A lamp structure, mainly comprising a roof rack, a positioning unit and a warning lamp, wherein:

the roof rack is fixed on the top of a car and has an engaging slot provided on the top end thereof;

the positioning unit has a detent portion, which corresponds to and engages in the engaging slot of the roof rack, formed on its bottom; a connecting portion corresponding to the warning lamp being formed to extend on the upper end of the detent portion, the connecting portion having a fitting indentation with a positioning member penetrating through the fitting indentation; the positioning member having a snap-fit portion formed on its one end and a positioning pulling lever pivotally provided on the other end;

the warning lamp is to be combined with the connecting portion of the positioning unit; the warning lamp having a snap-fit groove formed to correspond to and to engage with the snap-fit portion of the positioning member of the positioning unit; the positioning pulling lever being turned after the snap-fit portion is engaged in the snap-fit groove so as to allow the snap-fit portion tightened firmly within the snap-fit groove.

2. The lamp structure as claimed in claim 1, wherein the assembly indentation is an elongate indentation which enables moving of the warning lamp for adjusting its orientation angle and position.

3. The lamp structure as claimed in claim 1, wherein the warning lamp is fixed on one of the roof racks on the top of the car through the positioning unit.

4. The lamp structure as claimed in claim 1, wherein the warning lamps are fixed on two of the roof racks respectively on the top of the car through the positioning units.

5. The lamp structure as claimed in claim 1, wherein the warning lamp has a mounting slot formed on the upper end thereof for mounting and locking of a bicycle.

* * * * *